United States Patent Office 3,070,615
Patented Dec. 25, 1962

3,070,615
NOVEL ORGANO TIN COMPOUNDS
Dietmar Seyferth, 9 Bowdoin St., Arlington, Mass.
No Drawing. Filed Apr. 15, 1960, Ser. No. 22,400
14 Claims. (Cl. 260—429.7)

This invention relates to novel tin compounds and more particularly to a unique type of an organo tin-ammonium containing compound and methods of manufacture thereof.

It is an object of this invention to provide a novel class of organo tin compounds. Another object is to provide tin compounds which are thermally and hydrolytically stable and which have relatively high biocidal activity, particularly in water solution. Other objects and advantages of this invention will be more apparent from the following description and appended claims.

It has now been found that ionic organo tin compounds can be prepared having exceptional biocidal activity, and are particularly suitable for this use due to their excellent water solubility. The compounds of this invention are quaternary ammonium complexes with organo tin salts. The compounds include complexes of the type

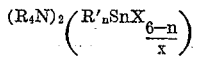

and

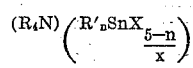

wherein R is hydrogen or an organo group, especially alkyl and aryl hydrocarbon groups containing 1 to about 20 carbon atoms, R' is an organo group as defined above, X is an anion, $x$ is the valence of the anion and $n$ is an integer of 1 to 3 inclusive.

Illustrative of the type of compounds covered by this invention are:

$[(CH_3)_4N]_2[(CH_3)SnCl_5]$,
$[(CH_3)_4N]_2[(CH_3)_2SnCl_4]$,
$[(CH_3)_4N]_2[(CH_3)_3SnCl_3]$,
$[(CH_3)_4N]_2[(C_2H_5)_3SnCl_3]$,
$[(CH_3)_4N]_2[(C_3H_7)_3SnCl_3]$,
$[(C_5H_6)_4N]_2[(C_{10}H_{21})SnBr_5]$,
$[(CH_3)_3HN]_2[(CH_3)SnI_5]$,
$[(CH_3)_2H_2N]_2[(CH_3)_2SnF_4]$,
$[(C_6H_5)H_3N]_2[(CH_3)_3SnCl_3]$,
$[(CH_3)(C_2H_5)_2HN]_2[(CH_3)_3SnCl_3]$,
$[H_4N]_2[(CH_3)Sn(CN)_5]$,
$[(C_2H_5)_4N]_2[(C_2H_5)_2Sn(SO_4)_2]$,
$[(CH_3)_4N]_2[(CH_3)_3SnClSO_4]$,
$[(C_6H_{13})_4N]_2[(CH_3)_3Sn(O_2CCH_3)_2Cl]$,
$[(C_3H_7)_4N]_2[(CH_3)_2Sn(O_2CC_6H_5)_2(NO_3)_2]$,
$[(C_2H_5)_4N]_2[(C_2H_5)_2Sn(SCN)_2Cl_2]$,
$[(CH_3)_3NCH_2CH_2OH]_2[C_3H_7Sn(NO_3)_2Cl_3]$,
$[(CH_3)_4N]_2[CH_3Sn(O_2CCF_3)_3Cl_2]$,
$[(CH_3)_4N]_2[(CH_3)_2Sn(HAsO_4)Cl_2]$,
$[(C_2H_5)_4N][(C_2H_5)_3Sn(CN)Br]$,
$[(CH_3)_4N][(CH_3)_2SnCl_3]$,
$[(C_2H_5)_4N][(C_2H_5)SnBr_4]$,
$[(C_6H_5)_4N][(CH_3)_3Sn(O_2CCH_3)_2]$,
$[(CH_3)_4N][(CH_3)SnCl(NO_3)_3]$ and the like.

More particularly, the compounds of this invention have the general formula

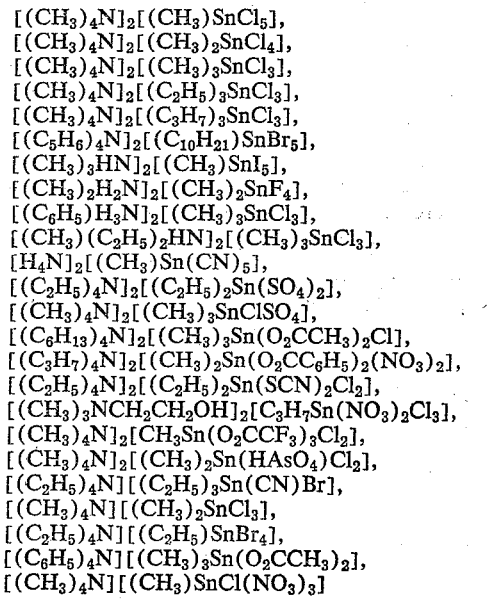

wherein R, R', X, $x$ and $n$ are as defined above; $y$ is an integer of from 0 to 4 inclusive; and $a$ is an integer of 1 to 2 inclusive. X can be the same or different anions and the anions can have the same valence or different valences. Where the anions (X) are different, the valence $x$ is the average of the valences of these anions. The groups R and R' are preferably hydrocarbons but can contain certain inert substituents such as the hydroxy, ether or carboalkoxy groups without departing from the present invention.

The organo group R or R' preferably contain from 1 to about 15 carbon atoms, although groups containing even more carbon atoms are suitable for some uses. These organo groups include alkyl groups such as methyl, ethyl, heptyl, octyl, dodecyl, isopropyl, 2-ethyl hexyl, cyclohexyl, benzyl and the like. The organo group can be an aryl group such as phenyl, tolyl, xylyl, ethyl phenyl, naphthyl, substituted naphthyls, indenyl and the like. Unsaturated aliphatic hydrocarbon radicals are also useful, including vinyl, dienyls, such as butadienyl, cyclopentadienyl, styryl and the like. Any of these hydrocarbon radicals can contain substituents which are inert in the preparatory reactions discussed more fully below.

The anions useful in the products of this invention can be either organic or inorganic. Typical examples of inorganic anions are the halogens, including chlorine, bromine, iodine, and fluorine, cyanate, isocyanate, thiocyanate, phosphide, phosphate, sulfide, sulfite, sulfate, nitrite, nitrate, arsenate and similar anions of inorganic acids. Typical examples of organic anions suitable for use in this invention are the acetate, propionate, butyrate, hexanoate, decanoate, benzoate and other residues of organic acids containing up to about 20 carbon atoms. In general, the anions most useful in the present invention are those of the monovalent and divalent type.

The compounds of the present invention can be prepared by any of several methods. One preferred method involves the reaction of a compound of the general formula $(R_yH_{4-y}N)X$ with a compound of the formula $(R'_nSnX_{4-n})$ wherein R, R', X, $y$ and $n$ are as defined above. The reaction is preferably carried out in an inert liquid medium and especially in a polar solvent, such as an alcohol or glycol. A temperature in the range of 0° to 200° C. can be employed, although the preferred temperature range is between 20 and 50° C. The ammonium compounds and tin compounds are preferably reacted in essentially stoichiometric quantities, although molar ratios of 1 to 3 (ammonium compound/tin compound) can be used. Thus, in the production of the compounds of the formula

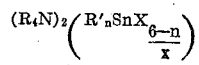

the reaction is best carried out using 2 moles of the ammonium compound to one of the tin compound. In the production of compounds of the formula

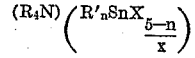

it is best to use a slight excess of the tin compound, i.e. up to about 10 percent.

The polar solvents which are suitable for use in the process of this invention include water and both monohydric and polyhydric alcohols. Likewise, both aliphatic and aromatic alcohols can be employed. Typical examples of suitable alcohols are methyl alcohol, ethyl alcohol, n-butyl alcohol, n-hexyl alcohol, isooctyl alcohol and the like. Other suitable alcohols include phenol, resorcinol, ethylene glycol, propylene glycol, glycerine, the cellosolves and other alcohols containing up to about 20 carbon atoms. In general, the monohydric alcohols are preferred and especially those containing 1 to about 10 carbon atoms. In most cases, essentially saturated solutions are used in the process in order to maximize throughput in the reactor. However, a wide range of concentrations can be used, i.e. normally from 1 to 100 moles of solvent per mole of product formed.

In contrast to the use of a solvent, as above, the reaction can be carried out at an elevated temperature wherein the reactants are liquid. Likewise, the reaction can be carried out in aqueous solutions, the water can readily be vaporized after completion of the reaction to crystallize the desired organo tin complex.

The following are typical examples which illustrate preparation of the compounds of this invention.

EXAMPLE I

A saturated ethanol solution of tetramethyl ammonium chloride (2 moles) was prepared and added at room temperature to one mole of an ethanol solution of dimethyl tin dichloride. A white micro crystalline precipitate resulted. The crystalline product was filtered and washed with ether and dried at about 95° C. A theoretical yield of bis(tetramethyl ammonium) dimethyltetrachlorostannate was obtained.

Examples II–VII inclusive were conducted using similar reaction conditions and techniques to those employed in Example I. The following Table I gives the various reactants and the products formed, together with the melting points for the products of each of the examples.

*Table I*

| Example | Reactants | | Product | Melting Point |
|---|---|---|---|---|
| II | (CH₃)₄NCl | (C₂H₅)₂SnCl₂ | [(CH₃)₄N]₂[(C₂H₅)₂SnCl₄] | 212–218° C. (dec.). |
| III | (CH₃)₃NCH₂CH₂OHCl | (CH₃)₂SnCl₂ | [(CH₃)₃NCH₂CH₂OH]₂[(CH₃)₂SnCl₄] | 86–90° C. (dec.). |
| IV | (CH₃)₄NCl | n-C₄H₉SnCl₃ | [(CH₃)₄N]₂[n-C₄H₉SnCl₅] | >305° C. |
| V | (CH₃)₄NCl | (C₆H₅)₂SnCl₂ | [(CH₃)₄N]₂[(C₆H₅)₂SnCl₄] | 272–278° C. (dec.). |
| VI | (CH₃)₄NCl | (C₆H₅)SnCl₃ | [(CH₃)₄N]₂[(C₆H₅)SnCl₅] | >305° C. |
| VII | (CH₃)₄NCl | (CH₃)₂SnBr₂ | [(CH₃)₄N]₂[(CH₃)₂SnBr₂Cl₂] | 176–177° C. |

A number of other products were prepared in accordance with the present invention having widely varying organic groups and different combinations of organic groups with different halides. Typical examples of such compounds are given in the following Table II. In each case the product analysis closely checked the theoretical value.

*Table II*

| Ex. | Reactants | | Product |
|---|---|---|---|
| VIII | [(CH₃)₄NBr] | (C₆H₅)SnBr₃ | [(CH₃)₄N]₂[(C₆H₅)SnBr₅] |
| IX | [(CH₃)₄NCl] | [(C₂H₅)₂SnCl₂] | [(CH₃)₄N]₂[(C₂H₅)₂SnCl₄] |
| X | [(C₂H₅)₄NBr] | [(CH₃)₂SnBr₂] | [(C₂H₅)₄N]₂[(CH₃)₂SnBr₄] |

Other examples of the present invention illustrating the use of different solvents and different reactants are given in the following examples.

EXAMPLE XI

Example I is repeated except that tetranaphthyl ammonium cyanide is reacted with dimethyl tin dicyanide in n-butyl alcohol solvent. The product,

[(naphthyl)₄N]₂[(CH₃)₂Sn(CN)₄]

is recovered in good yield.

EXAMPLE XII

Tetracyclohexyl ammonium acetate is reacted in phenol solvent at 100° C. with diethyl tin diacetate. The product obtained is [(C_y)₄N]₂[(C₂H₅)₂SnAc₄].

EXAMPLE XIII

Ammonium hexanoate is reacted with diphenyl tin sulfate in 2-ethyl hexanol solvent at reflux temperature. The product obtained is (NH₄)₂[(C₆H₅)₂SnSO₄(O₂CC₅H₁₁)₂]

EXAMPLE XIV

Tetramethyl ammonium chloride is reacted with phenyl tin phosphate in ethylene glycol. After maintaining the reaction at reflux temperature for two hours the product, [(CH₃)₄N]₂[(C₂H₅)SnPO₄Cl₂], is obtained in good yield.

EXAMPLE XV

Tetraethyl ammonium bromide is reacted in ethanol solvent at reflux temperature with a mole equivalent of trimethyl tin bromide. When these reactants are employed in essentially molar concentration the product obtained is [(C₂H₅)₄N][(CH₃)₃SnBr₂].

EXAMPLE XVI

Tetraphenyl ammonium acetate is reacted with diphenyl tin diacetate in propylene glycol at 65° C. The reaction mixture is agitated for a period of about three hours. The product is precipitated by the addition of ethyl ether. A good yield of

[(C₆H₅)₄N][(C₆H₅)₂SnAc₃]

is obtained. Similar results are obtained when the reaction is conducted in water solution. In this case, the product is recovered by evaporation of the water.

EXAMPLE XVII

An aqueous 1 molar solution of tetramethyl ammonium chloride is added to 0.5 mole of dimethyl tin dichloride, also as a 1 molar aqueous solution. With agitation, the solution is heated to 80° C. for five hours. The water is then evaporated, resulting in crystallization of the white bis(tetramethyl ammonium) dimethyltetrachlorostannate.

The crude reaction mixtures containing the compositions of this invention are particularly effective against certain organisms and, therefore, no purification of the product is necessary prior to their utilization as biocides. The following are additional typical examples which produce particularly biocidally effective crude mixtures. The reaction products are prepared by fusion, the product being merely washed with ligroin (petroleum ether). In general, these products usually contain about 90 weight percent or more of a compound of the formula (R₄N)₂(R₃SnCl₃)

and a minor amount of (R₄N)(R₃SnCl₂). There may also be a trace of the reactants, e.g. R₄NCl.

EXAMPLE XVIII 4.36 parts tetramethyl ammonium chloride were mixed with 4.82 parts triethyl tin chloride and heated at 200° C. for 6½ hours. The resultant solid was washed with ligroin leaving 7.9 parts product, principally

[(CH₃)₄N]₂[(CH₂H₅)₃SnCl₃]

EXAMPLE XIX 6.6 parts (CH₃)₄NCl were mixed with 7.4 parts triethyl tin chloride and heated at 100–120° C. for 1½ hours. The resultant solid was washed with ligroin, yielding 12.0 parts product.

EXAMPLE XX 2.88 parts (CH₃)₄NCl were mixed with 3.5 parts (CH₃)₃SnCl and heated at 140–150° C. for 8½ hours. The resultant solid was washed with ligroin, yielding 6 parts product.

EXAMPLE XXI 5.8 parts (CH₃)₄NCl were mixed with 7 parts (CH₃)₃SnCl and heated at 120° C. for 1¾ hours. The cooled solid was washed with ligroin, leaving 11.8 parts product.

The products of Examples XVIII through XXI were white, very water soluble and insoluble in the ether, ligroin and the like.

The triemethyl and triethyl tin chlorides used in Examples XVIII through XXI inclusive were prepared by reacting the corresponding Grignard reagent with stannic chloride.

The products of this invention can be used as insecticides, germicides, slimicides, herbicides and bactericides. When so used, they are normally dissolved in a liquid medium, e.g. water, alcohol and, in some cases, they are dispersed in a hydrocarbon such as kerosene, toluene and the like. Generally, the compounds are used in relatively dilute concentrations, i.e. from about 0.1 to about 20 weight percent. In addition to the active tin compounds, the solution can contain other biocides, dispersing agents or other additives to complement or supplement the biocidal activity of the compounds of this invention.

In addition to use in liquid media, the compounds claimed herein can be used as a dust or powder, either alone or in combination with other ingredients. Frequently, it is desired to admix the compounds with an inert, such as talc, in a concentration ranging from about 1 to 30 weight percent of the active component.

A more detailed disclosure of the use of the compounds of this invention to inhibit the growth of sulfate reducing bacteria is given in the patent application of Ralph N. Thompson, entitled "Inhibiting Bacterial Growth," filed simultaneously herewith.

The compounds of this invention are also useful in vapor or liquid tin plating processes wherein the compounds are decomposed in contact with a heated substrate maintained at a temperature above the decomposition temperature of the tin compound. The tin is plated on the substrate, either metallic or non-metallic, in a highly uniform and impervious form. Such coatings provide excellent corrosion protection due to the nature of the coating and the desirable properties of the compound from which the metal is deposited. These compounds can be tailor-made to provide the most desirable vapor pressure characteristics and thermal stability properties to permit tin plating on all types of substrates and under widely varying temperature conditions. When desired, more volatile liquids and gases can be used to increase volatilization of the tin compound.

The novel compounds disclosed herein are also very useful as intermediates in the preparation of other valuable compounds.

I claim:

1. A quaternary ammonium organotin salt having the general formula

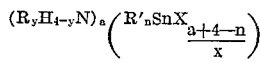

wherein R and R' are radicals selected from the group consisting of hydrogen and of alkyl and aryl radicals having from one to twenty carbon atoms, X is a radical selected from the group consisting of halide ions, cyanide ions, sulfate ions, thiocyanate ions, nitrate ions, anions of aliphatic hydrocarbon monocarboxylic acids containing up to ten carbon atoms, benzoate ions and trifluoroacetate ions, $y$ is an integer from 0 to 4, inclusive, $a$ is an integer from 1 to 2, inclusive, $x$ is the valence of the anion, and $n$ is an integer from 1 to 3, inclusive, such that $$\frac{a+4-n}{x}$$

is an integer.

2. The process for preparing a quaternary ammonium organotin salt having the general formula

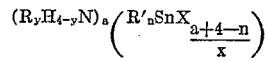

wherein R and R' are radicals selected from the group consisting of hydrogen and of alkyl and aryl radicals having from one to twenty carbon atoms, X is a radical selected from the group consisting of halide ions, cyanide ions, sulfate ions, thiocyanate ions, nitrate ions, anions of aliphatic hydrocarbon monocarboxylic acids containing up to ten carbon atoms, benzoate ions and trifluoroacetate ions, $y$ is an integer from 0 to 4, inclusive, $a$ is an integer from 1 to 2, inclusive, $x$ is the valence of the anion, and $n$ is an integer from 1 to 3, inclusive, such that $$\frac{a+4-n}{x}$$

is an integer, which comprises mixing a substituted ammonium salt of the general formula $R_4NX$ with an organotin compound of the general formula $R'_nSnX_{4-n}$, wherein $n$ is an integer from 1 to 3, inclusive, and heating the mixture for 1 to 8½ hours at a temperature of from 100° to 200° C.

3. The compound of claim 1 wherein X is halogen.

4. The compound of claim 1 wherein X is chlorine.

5. Bis (tetramethylammonium) dimethyltetrachlorostannate.

6. Bis (tetramethylammonium) diethyltetrachlorostannate.

7. Bis (beta-ihydroxyethyltrimethylammonium) dimethyltetrachlorostannate.

8. Bis(tetramethylammonium) n-butylpentachlorostannate.

9. Bis(tetramethylammonium) diphenyltetrachlorostannate.

10. Bis(tetramethylammonium) phenylpentachlorostannate.

11. Bis (tetramethylammonium) dimethyldichlorodibromostannate.

12. Bis (tetramethylammonium) phenylpentabromostannate.

13. Bis (tetramethylammonium) divinyltetrachlorostannate.

14. Bis (tetraethylammonium) dimethyltetrabromostannate.

References Cited in the file of this patent

UNITED STATES PATENTS

| | | |
|---|---|---|
| 2,172,979 | Kohler et al. | Sept. 12, 1939 |
| 2,580,473 | Sowa et al. | Jan. 1, 1952 |
| 2,729,651 | Reppe et al. | Jan. 3, 1956 |

OTHER REFERENCES

Druce: J. Chem. Loc. Transactions (London), 121, Pt. 2, 1859–1863 (1922).

Gutmann: "Z. fur Arnorg. U. Allgem. Chem.," volume 266, pages 331–344, November 1951.

UNITED STATES PATENT OFFICE

CERTIFICATE OF CORRECTION

Patent No. 3,070,615            December 25, 1962

Dietmar Seyferth

It is hereby certified that error appears in the above numbered patent requiring correction and that the said Letters Patent should read as corrected below.

Column 6, line 37, for "(beta-ihydroxyethyltrimethylammonium)" read -- (beta-hydroxyethyltrimethylammonium) --.

Signed and sealed this 24th day of September 1963.

(SEAL)
Attest:

ERNEST W. SWIDER
Attesting Officer

DAVID L. LADD
Commissioner of Patents